(12) United States Patent
Burmeister et al.

(10) Patent No.: US 8,909,130 B1
(45) Date of Patent: Dec. 9, 2014

(54) RELAY DEVICE DEPLOYER SYSTEM

(75) Inventors: Aaron Burmeister, San Diego, CA (US); Narek Pezeshkian, San Diego, CA (US); Hoa G. Nguyen, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 2257 days.

(21) Appl. No.: 11/832,103

(22) Filed: Aug. 1, 2007

Related U.S. Application Data

(60) Provisional application No. 60/860,235, filed on Nov. 8, 2006.

(51) Int. Cl.
*H04B 3/36* (2006.01)
*H04B 7/14* (2006.01)

(52) U.S. Cl.
USPC ............................................................ 455/7

(58) Field of Classification Search
USPC ...................................................... 455/11.1
See application file for complete search history.

(56) References Cited

U.S. PATENT DOCUMENTS

| | | | |
|---|---|---|---|
| 6,665,521 B1 * | 12/2003 | Gorday et al. | 455/67.11 |
| 2006/0132643 A1 * | 6/2006 | Chang et al. | 348/373 |

OTHER PUBLICATIONS

H. G. Nguyen, N. Pezeshkian, M. Raymond, A. Gupta, J. M. Spector; Autonomous Communication Relays for Tactical Robots; Proceedings of ICAR 2003, The 11th International Conference on Advanced Robotics Coimbra, Portugal, Jun. 30-Jul. 3, 2003.

Hoa G. Nguyen, Nathan Farrington, and Narek Pezeshkian; Maintaining Communication Link for Tactical Ground Robots; AUVSI Unmanned Systems North America 2005, Anaheim, CA, Aug. 3-5, 2004.

* cited by examiner

*Primary Examiner* — Ankur Jain
(74) *Attorney, Agent, or Firm* — SPAWAR Systems Center Pacific; Kyle Eppele; J. Eric Anderson

(57) ABSTRACT

A relay device deployment system comprising: a deployer configured to be mounted on a mobile platform; a node radio mounted to the deployer; a self-righting, self-contained, wireless relay device releasably stowed in the deployer, a deployment mechanism mounted to the deployer; and a processor mounted inside the deployer. The processor is operatively coupled to the node radio and the deployment mechanism. The node radio is configured to operate as a node in the network. The deployment mechanism is configured to deploy the relay device. The processor is configured to monitor the network's strength and to send a signal to the deployment mechanism to deploy the relay device when the network strength drops below a threshold value. The relay device comprises an extendable antenna. The relay device is configured to be deployed from the deployer to a support surface and to operate as a node in an ad hoc telecommunications network.

17 Claims, 10 Drawing Sheets

RELAY DEVICE DEPLOYER SYSTEM

CROSS-REFERENCE TO RELATED APPLICATION

This application claims benefit of U.S. Provisional Application 60/860,235, filed 8 Nov. 2006, entitled, "Communications Relay Brick and Deployer." This application is also related to U.S.application Ser. No. 11/832,065, filed 1 Aug. 2007, U.S. Pat. No. 8,788,130, entitled "Wireless, Self-Contained Relay Device" (Navy Case #98480).

FEDERALLY-SPONSORED RESEARCH AND DEVELOPMENT

This invention (Navy Case No. 98795) is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice (619) 553-2778; email T2@spawar.navy.mil. Reference Navy Case Number 98795.

BACKGROUND OF THE INVENTION

Maintaining communications between mobile platforms in non-line-of-sight conditions can be problematic. Buildings, trees, hills, and other obstructions negatively reflect, distort, and/or absorb radio signals. A need exists for a system to deploy wireless, non-line-of-sight, relay devices to preserve communications between mobile platforms.

BRIEF DESCRIPTION OF THE DRAWINGS

Throughout the several views, like elements are referenced using like references.

DETAILED DESCRIPTION OF EMBODIMENTS

Figure 1:
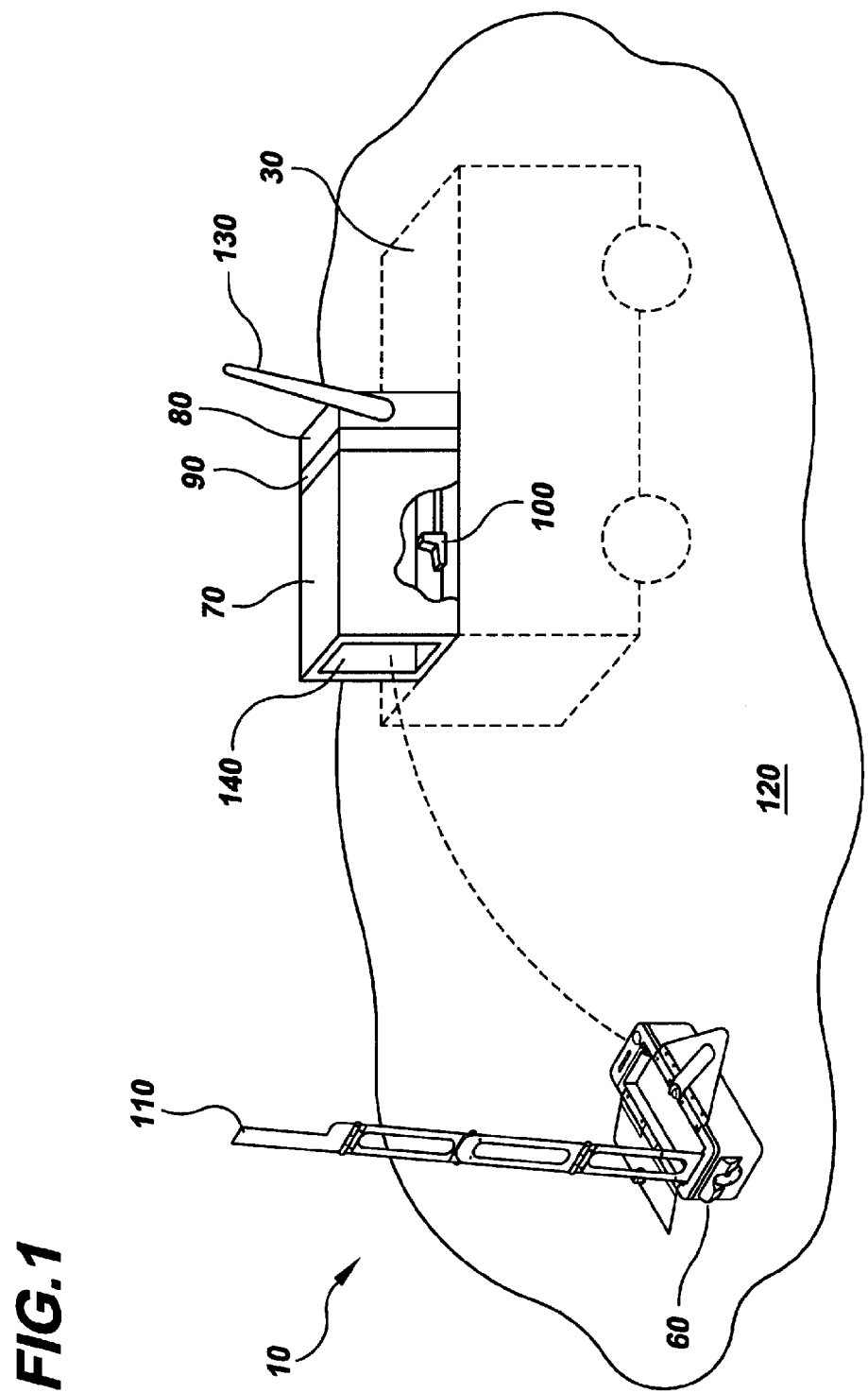
FIG. 1 shows an embodiment of a relay device deployment system.
Figure 5:
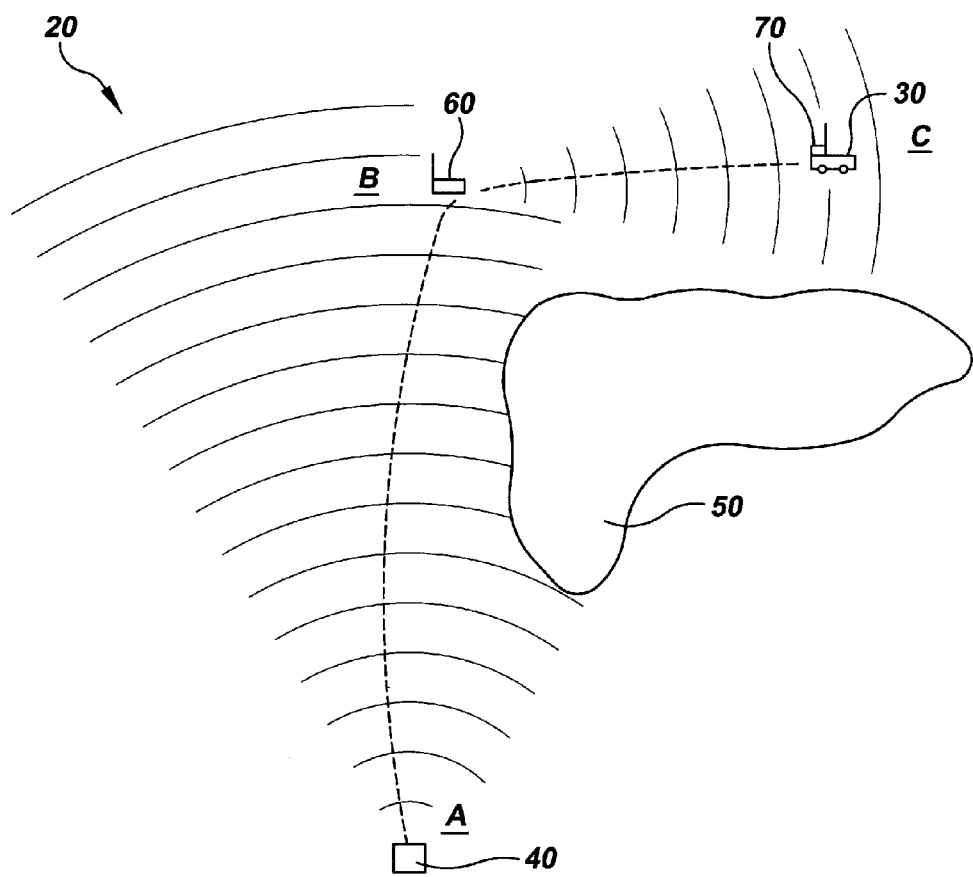
FIG. 5 shows an ad hoc telecommunications network being maintained between a base station and a mobile platform in the presence of an obstacle.

The relay device deployment system 10, shown in FIG. 1, is a system that allows for an ad hoc telecommunications network 20 to be maintained between a mobile platform 30 and a base station 40, as shown in FIG. 5. Obstacles 50, also shown in FIG. 5, between the base station 40 and the mobile platform 30 cause the signal strength A of the network 20 to diminish. System 10 is configured to automatically deploy a relay device 60 from the mobile platform 30 once the signal strength A reaches a predetermined threshold value X. The relay device 60 is configured to operate as a node in the network 20, thus preserving the network 20 between the mobile platform 30 and the base station 40.

FIG. 1 shows an embodiment of system 10 comprising a relay device 60 and a deployer 70. The deployer 70 is configured to be mounted on the mobile platform 30 and to stow the relay device 60. The deployer 70 comprises a radio 80, a processor 90, and a deployment mechanism 100. The radio 80 and the relay device 60 are each configured to operate as nodes in the network 20, as shown in FIG. 5 below. Upon receiving a command from the processor 90, the deployment mechanism 100 is configured to deploy the relay device 60. The processor 90 is operatively coupled to the radio 80 and the deployment mechanism 100. The processor 90 is configured to monitor the signal strength A of the network 20 and to send a command to the deployment mechanism 100 to deploy the relay device 60 when the signal strength A drops below a threshold value X. The relay device 60, comprising an extendable antenna 110, is self-righting, self-contained, and wireless. The relay device 60 is configured to be deployed from the deployer 70 to a support surface 120. The support surface 120 may be the ground, the floor of a building, the surface of the water, or any other surface capable of supporting the relay device 60.

The deployer 70 may be any size or shape capable of stowing a relay device 60 and of being mounted on the mobile platform 30. The deployer 70 may be mounted to any surface of the mobile platform 30, top, bottom, front, back, or sides. The mobile platform 30 may be any land or water-surface-based platform capable of locomotion. Examples of the mobile platform 30 include, but are not limited to the following: a human; an animal; land-based vehicles, both manned and unmanned (autonomous & radio-controlled); and water craft, both manned and unmanned (autonomous & radio-controlled). Also shown in FIG. 1 is a deployer antenna 130, operatively coupled to the radio 80, and a relay bay 140 configured for stowing the relay device 60. The radio 80 may be any radio capable of operating as a node in an ad hoc telecommunications network 20. An example of the radio 80 is a PC Card 802.11b radio and a small single-board computer (such as Bright Star Engineering's™ nanoEngine™, utilizing Intel's® StrongARM™ processor) both coupled to a radio interconnect board. FIG. 1 shows the deployment mechanism 100 as a spring-loaded launcher, but it is to be understood that the deployment mechanism 100 may be any mechanism capable of deploying the relay device 60 from the deployer 70 to the support surface 120. The processor 90 may be any processor that is capable of monitoring the signal strength A in the network 20 and of sending a signal to deploy the relay device 60 when the signal strength A drops below a threshold value X.

Figure 2:
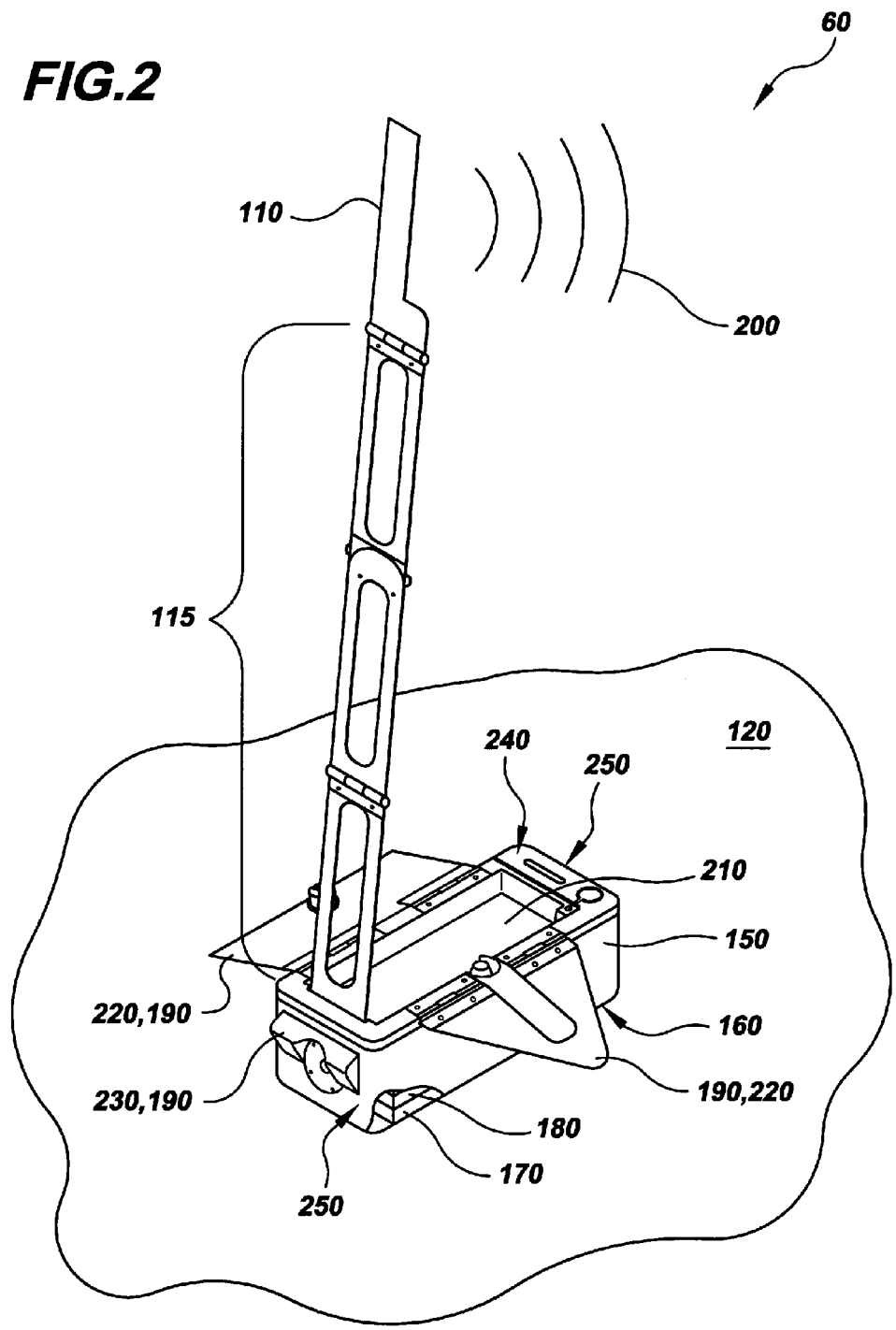
FIG. 2 shows an embodiment of a relay device.

FIG. 2 shows one embodiment of a relay device 60. In this embodiment, the relay device 60 comprises an extendable antenna 110 atop a mast 115, a housing 150, a bottom surface 160, an internal radio 170, a relay processor 180, and a self-righting mechanism (SRM) 190. The housing 150 of the relay device 60 rests on the bottom surface 160. The internal radio 170 is configured to relay RF signals 200 and to operate as a node in the network 20, as described in greater detail hereafter with regards to FIG. 5. Although the housing 150 is shown in FIG. 2 as being a generally rectangular prism, it is to be understood that the housing 150 may be any size or shape having sufficient internal volume to house the internal radio 170, and the relay processor 180. The housing 150 may be constructed of any material capable of forming a watertight compartment to house the internal radio 170, and the relay processor 180. Example housing 150 materials include, but are not limited to: steel, titanium, aluminum, carbon fiber, fiberglass, thermoset plastic, and thermoplastic such as acrylonitrile butadiene styrene (ABS). The relay device 60 may also be ruggedized such that the relay device 60 continues to function properly after being subjected to shock forces resulting from being deployed from the mobile platform 30. In one embodiment the relay device 60 may withstand shock forces of up to 125 gs. The relay processor 180 is mounted within the housing 150 and is operatively coupled to the internal radio 170 and the SRM 190. In one embodiment, the relay device 60 may be powered by Li-ion batteries with onboard high-efficiency DC-DC converters, all mounted within the housing 150.

The embodiment of the relay device 60 shown in FIG. 2 shows the extendable antenna 110 in an extended position with the mast 115 fully extended. The antenna 110 may be any antenna capable of receiving and transmitting signals over the network 20. Example embodiments of the antenna 110 include, but are not limited to, monopoles, dipoles, fractals, and antenna arrays. For example, the antenna 110 may be half wavelength dipole antenna with a gain of 2 dBi. The antenna 110 is operatively coupled to the internal radio 170. The mast 115 may be any structure capable of supporting the antenna 110. In the embodiment of the relay device 60 shown in FIG. 2, the mast 115 is separated into three hinged segments. Each hinged segment is connected to the adjoining segment by a spring-loaded hinge. An antenna bay 210 for stowing the antenna 110 and mast 115 is also shown in FIG. 2. In the embodiment shown in FIG. 2, bay doors 220, which are part of the SRM 190, are configured to enclose the collapsed mast 115 and the antenna 110 in the antenna bay 210. Once the spring-loaded bay doors/SRM 190 have been released from a collapsed position the relay device 60 rights itself, as shown in FIG. 3, and the spring-loaded mast 115 extends the antenna 110 into the extended position.

The embodiment of the SRM 190 shown in FIG. 2 utilizes bay doors 220 of the antenna bay 210 as well as geometric constraints 230 built into the housing 150 to right the relay device 60. In the embodiment shown in FIG. 2, the bay doors 220 are mounted to the housing 150 by hinges on opposite outer edges of an upper surface 240 of the housing 150. The bay doors 220 have a closed position, as shown in FIG. 1, where one bay door 220 lies generally flush with the upper surface 240 of the housing and the other bay door 220 lies underneath the aforementioned bay door 220. In the embodiment shown in FIG. 2, the hinges of the bay doors 220 are spring-loaded such that when released from their closed position, the bay doors 220 force the housing 150 to come to rest on its bottom surface 160 by interacting with the support surface 120 on which the housing 150 rests, as shown below in FIG. 3. In the embodiment depicted in FIGS. 1 and 2, the housing 150 is generally a right rectangular prism and further comprises two end surfaces 250 that are perpendicular to the axis of rotation of the hinges of the bay doors 220. The geometric constraints 230, as shown in the embodiment of FIG. 2, are protrusions, which may be mounted, molded, or carved to the end surfaces 250. The geometric constraints 230 prevent the relay device 60 from resting on either of its end surfaces 250. For example, if the relay device 60 is dropped from the mobile platform 30 the SRM 190 is configured to reposition the housing 150 from any initial position to an upright position. In the upright position, the bottom surface 160 of the housing 150 rests on the support surface 120.

Figure 3:
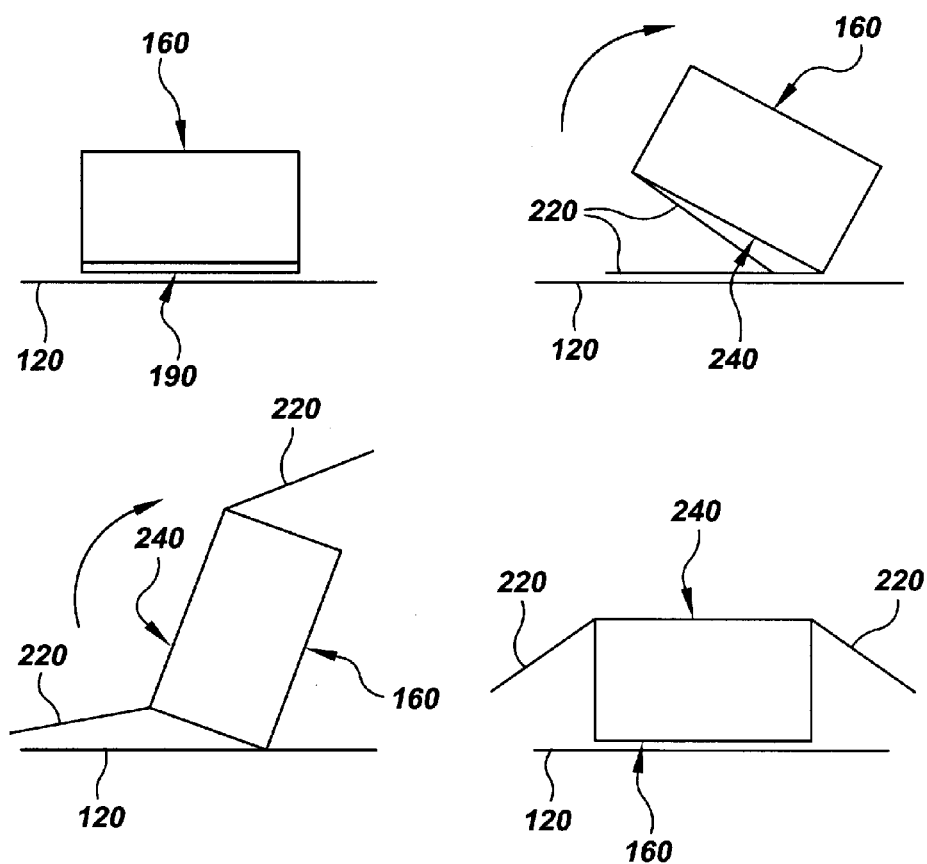
FIG. 3 shows a relay device self-righting itself.

FIG. 3 is a series of drawings showing the relay device 60 righting itself from an upside-down position. As shown, the relay device 60 starts from an initial position where the upper surface of the relay device 60 rests on the support surface 120. In this embodiment, upon a command from the relay processor 180, the SRM 190 pushes the relay device 60 into an upright position with the bottom surface 160 resting on the support surface 120. The SRM 190 is not limited to the embodiment shown in FIG. 3, but may be any mechanism incorporated into relay device 60 that is capable of righting the relay device 60 from any initial position. In the embodiment of the relay device 60 depicted in FIG. 3, the support surface 120 may be any solid surface over which the mobile platform 30 may move and which is capable of supporting the relay device 60.

Figure 4:
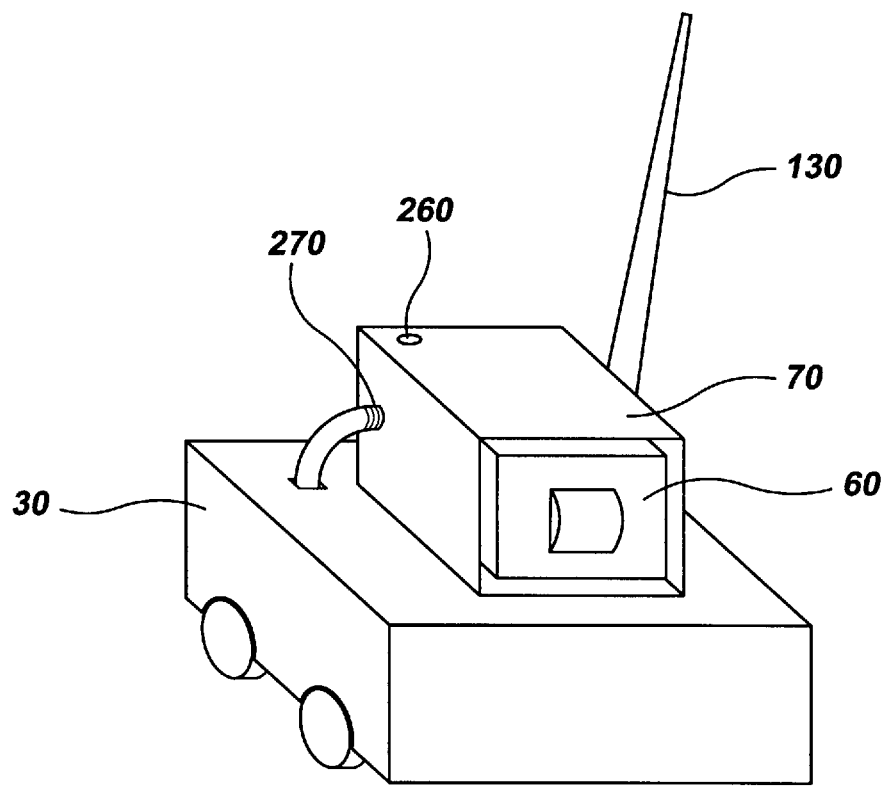
FIG. 4 shows an embodiment of a relay device deployment system with a stowed relay device on a mobile platform.

FIG. 4 shows the system 10 with a stowed relay device 60 mounted to a mobile platform 30. Also shown in FIG. 4, is a manual release button 260 on the deployer 70 configured to release the stowed relay device 60 when pressed by a user. The deployer 70 is also shown as being communicatively coupled to the mobile platform 30 via an Ethernet interface port 270.

FIG. 5 shows how the system 10 may be used to maintain contact between the mobile platform 30 and the base station 40 in the presence of obstacles 50. The mobile platform 30 traveling from position A towards position B maintains line of sight (LOS) communications with the base station 40. However, as the mobile platform 30 begins to travel from position B to position C, radio communications begin to be obstructed by obstacle 50. Example embodiments of obstacle 50 include, but are not limited to buildings, trees, hills, or any other physical or nonphysical obstructions that negatively reflect, distort, and/or absorb radio signals. The base station 40 may be any stationary or mobile site capable of being a node in the network 20. For example, the base station 40 may be, but is not limited to, a vehicle-mounted control center, a man-portable control center, or a control center in a building. FIG. 5 shows how a relay device 60 may be placed in the vicinity of position B to allow the mobile platform 30 to continue around obstacle 50 towards position C without losing radio connectivity with the base station 40.

Figure 6:
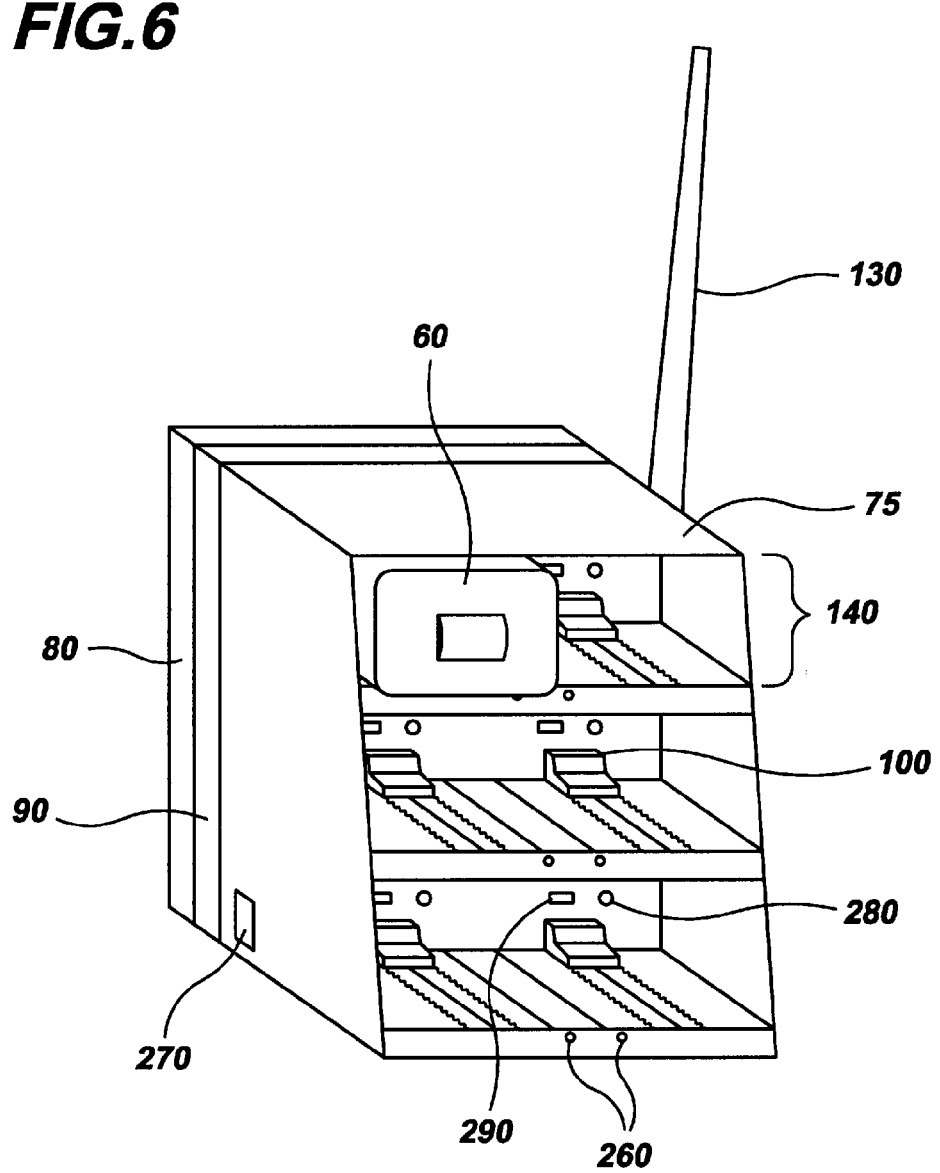
FIG. 6 shows an embodiment of the relay device deployment system with a multi-bay deployer.

FIG. 6 depicts another embodiment of system 10 comprising a multi-bay deployer 75 that is configured to stow multiple relay devices 60 in multiple relay bays 140. Only one relay device 60 is shown in FIG. 6 for the sake of clarity. Also shown in FIG. 6, are a deployment detection sensor 280 and a magnetic field generator 290, both mounted within each relay bay 140 and operatively coupled to the processor 90. Each relay device 60 may have an internal magnetic activation switch (not shown) configured to switch in the absence of a local magnetic field, thus activating the relay device 60. The processor 90 may be configured to activate a relay device 60 in any given relay bay 140 by manipulating a local magnetic field with the corresponding magnetic field generator 290. The deployment detection sensor 280 is configured to send a signal to the processor 90 upon detecting the absence of the relay device 60 in its corresponding relay bay 140. Each relay bay 140 may have a corresponding deployment detection sensor 280, deployment mechanism 100, and manual release button 260. Although the multi-bay deployer 75 is shown in FIG. 6 as having 6 relay bays 140, it is to be understood that the multi-bay deployer 75 is not limited to 6 relay bays 140, but may have any number of relay bays 140 and corresponding relay devices 60.

In the embodiment of system 10 shown if FIG. 6, the multi-bay deployer 75 is configured to operate as a node in network 20. The multi-bay deployer 75 is configured to be physically and communicatively coupled to the mobile platform 30. In operation, the processor 90 activates one of the stowed relay devices 60. The processor 90 then monitors the signal strength A of the network 20, while ignoring the signal emanating from the stowed, activated relay device 60. Once the signal strength A reaches the predetermined threshold value X the processor 90 sends a signal to the deployment mechanism 100. Upon receiving the signal from the processor 90, the deployment mechanism 100 then deploys the activated relay device 60 to the support surface 120, over which the mobile platform 30 may be traveling. Once the relay device 60 has been deployed, the self-righting mechanism 190 moves the relay device 60 into an upright position and the antenna 110 extends. The deployed relay device 60 then operates as a new node in the network 20. This procedure may be repeated until each relay device 60 that is stowed in the multi-bay deployer 75 has been deployed.

Figure 7:
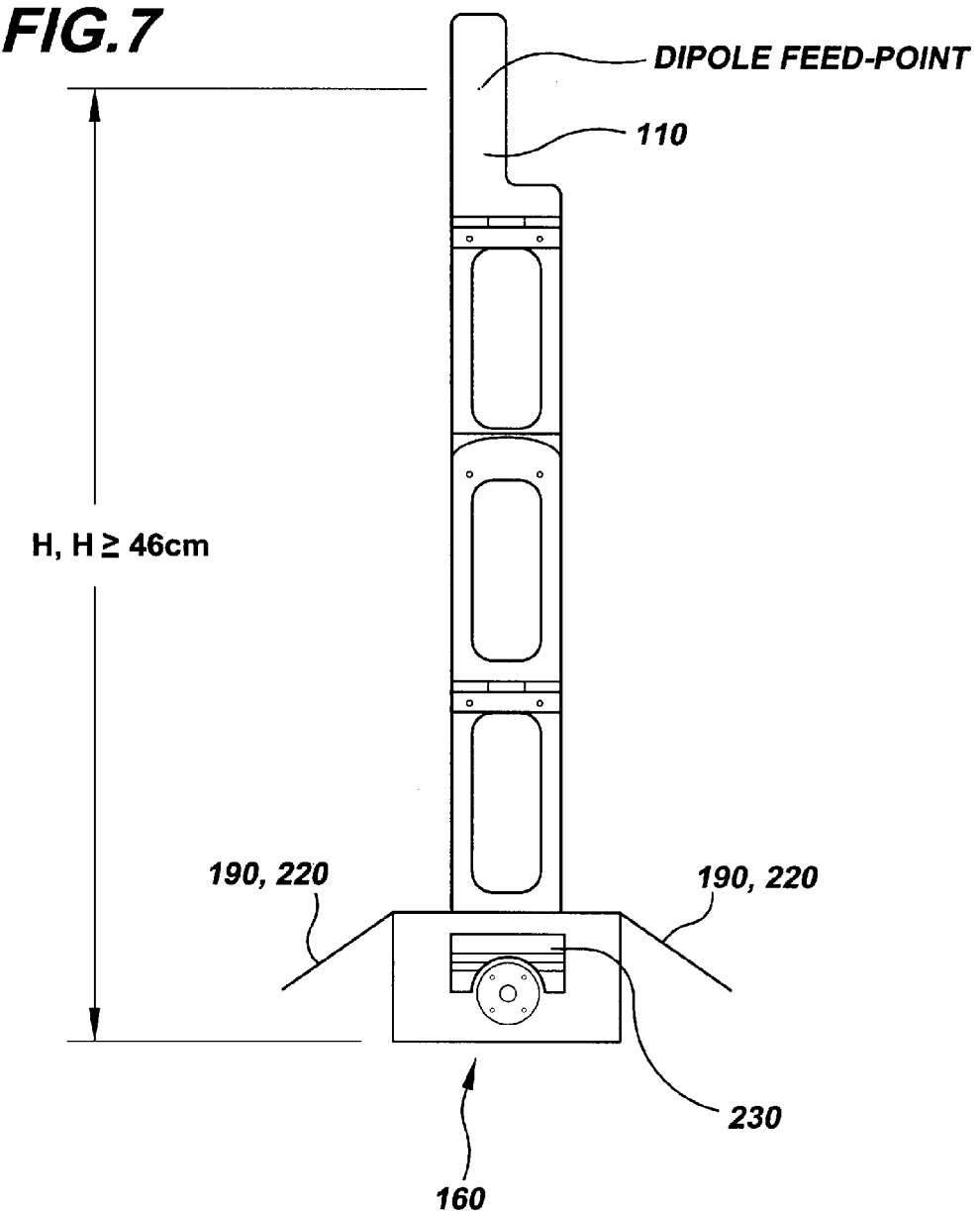
FIG. 7 shows a front view of the relay device with an extended antenna.

FIG. 7 shows one embodiment of the relay device 60 where the antenna 110 is a dipole antenna with a height H (defined as the distance from the dipole feed-point to the bottom surface 160) that is greater than or equal to about 46 centimeters (18 inches). For example, the antenna 110 may be a half-wavelength antenna with a 2 dBi gain and a height H of about 50 centimeters (about 20 inches). In the latter example, the coupling strength between the antenna 110 and another network 20 node about 400 meters (about 437 yards) away would exceed about −114 dBm.

Figure 8:
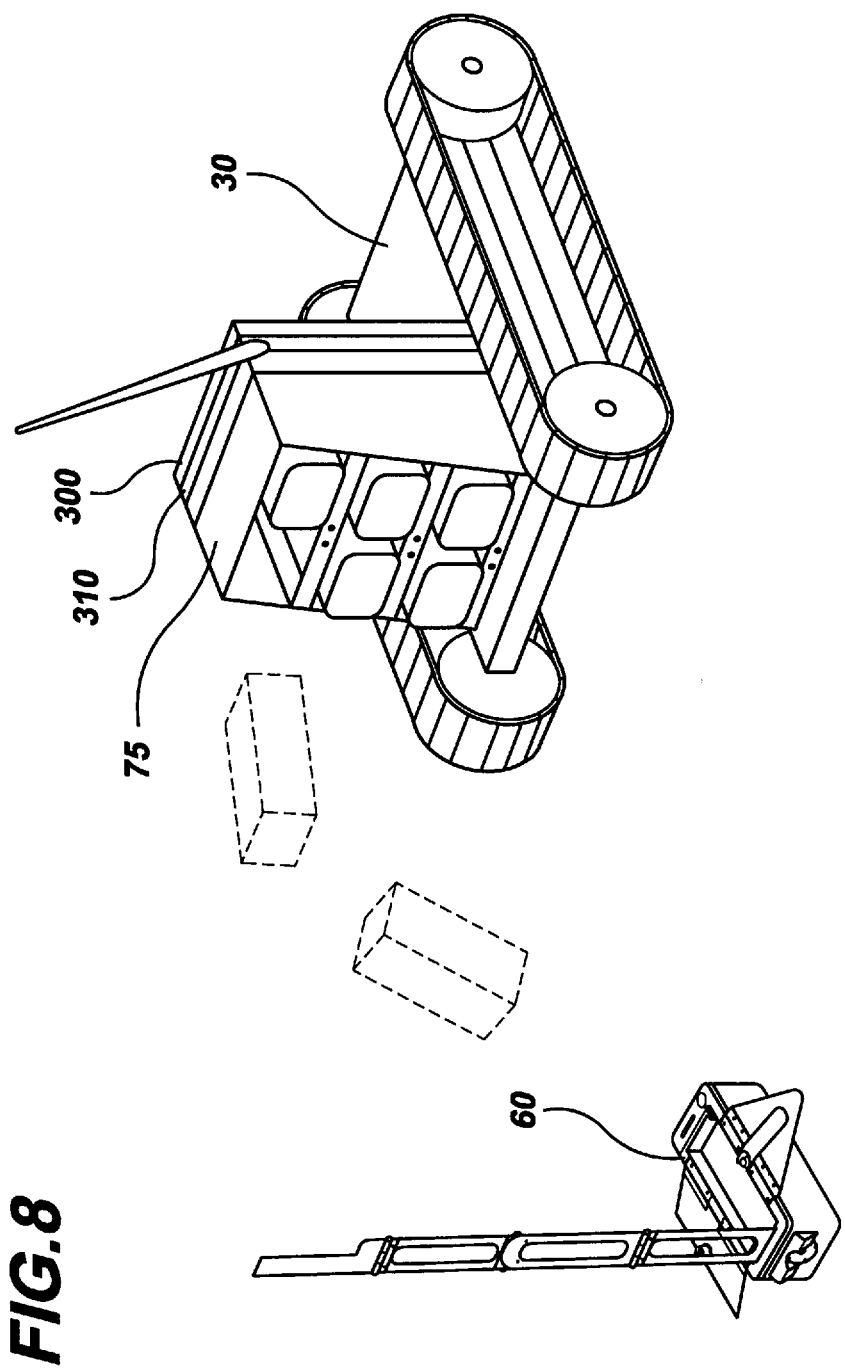
FIG. 8 shows an embodiment of the relay device deployment system mounted to an unmanned mobile platform.

FIG. 8 shows an alternate embodiment of system 10 wherein the processor 90 comprises a first processor 300 and a second processor 310 communicatively coupled to each other. In this embodiment, the first processor 300 is configured to communicate over the network 20, to monitor the signal strength A, and to send a signal to the second processor 310 when the signal strength A drops below the threshold value X. The first processor 300 is also configured to receive relay device 60 status information from the second processor 310. The second processor 310 is operatively coupled to the deployment mechanism 100, the magnetic field generator 290, and the deployment detection sensor 280. The second processor 310 is configured to interpret commands sent by the first processor 300 and to communicate relay device 60 deployment status to the first processor 300. For example, upon receiving a signal from the first processor 300 that the threshold value X has been reached, the second processor 310 would then cause the deployment mechanism 100 to deploy a pre-activated relay device 10. If the relay device 60 was properly deployed from the relay bay 140, the deployment detection sensor 280 would send a signal to the second processor 310 indicating that it no longer detects a relay device 60 in the corresponding relay bay 140. The second processor 310 would then communicate to the first processor 300 that the deployment was successful. The first processor 300 would then, in turn, communicate to the base station 40 that a relay device 60 has been successfully deployed.

In the multi-bay deployer 75 embodiment of system 10, after a successful deployment of a relay device 60, the second processor 310 would then cause a magnetic field generator 290 to manipulate a local magnetic field in its corresponding relay bay 140 to cause the corresponding relay device 60 to activate. The second processor 310 would then communicate to the first processor 300 that it has attempted to activate another relay device 60. The first processor 300 would then monitor the network 20 to see if a signal from the stowed, activated relay device 60 can be detected. If the first processor 300 cannot detect a signal from the stowed, activated relay device 60, the first processor 300 will instruct the second processor 310 to activate and prepare to deploy a different stowed relay device 60. Then the first processor 300 will send status information to the base station 40 as to whether or not the stowed relay device 60 successfully activated.

Figure 9:
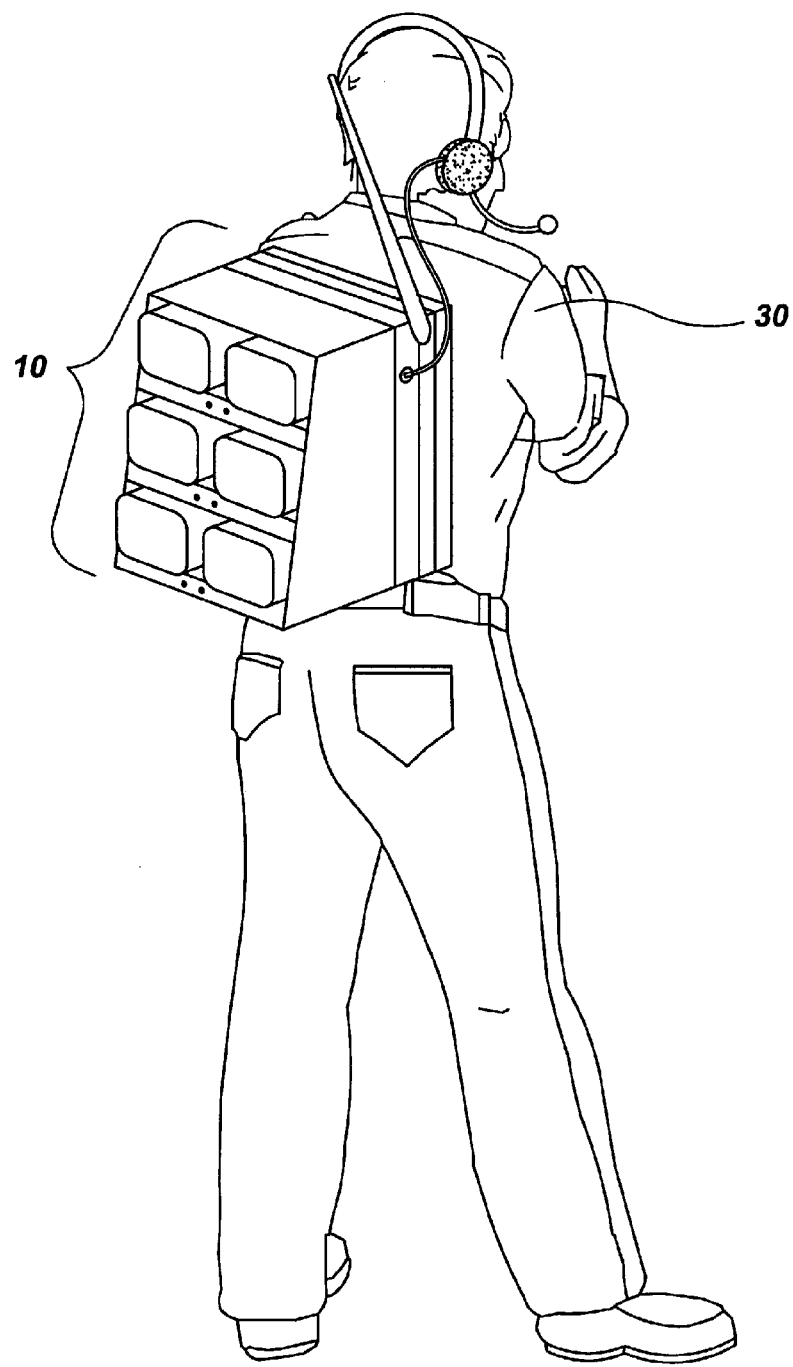
FIG. 9 shows an embodiment of the relay device deployment system carried by a person.

FIG. 9 depicts a person as the mobile platform 30 carrying system 10. Although FIG. 9 shows the mobile platform 30 (the person) carrying system 10 on his/her back, it is to be understood that system 10 may be mounted in any location on mobile platform 30. For example, a smaller version of system 10 may be mounted to a shoe, another article of clothing, or even held in a hand.

Figure 10:
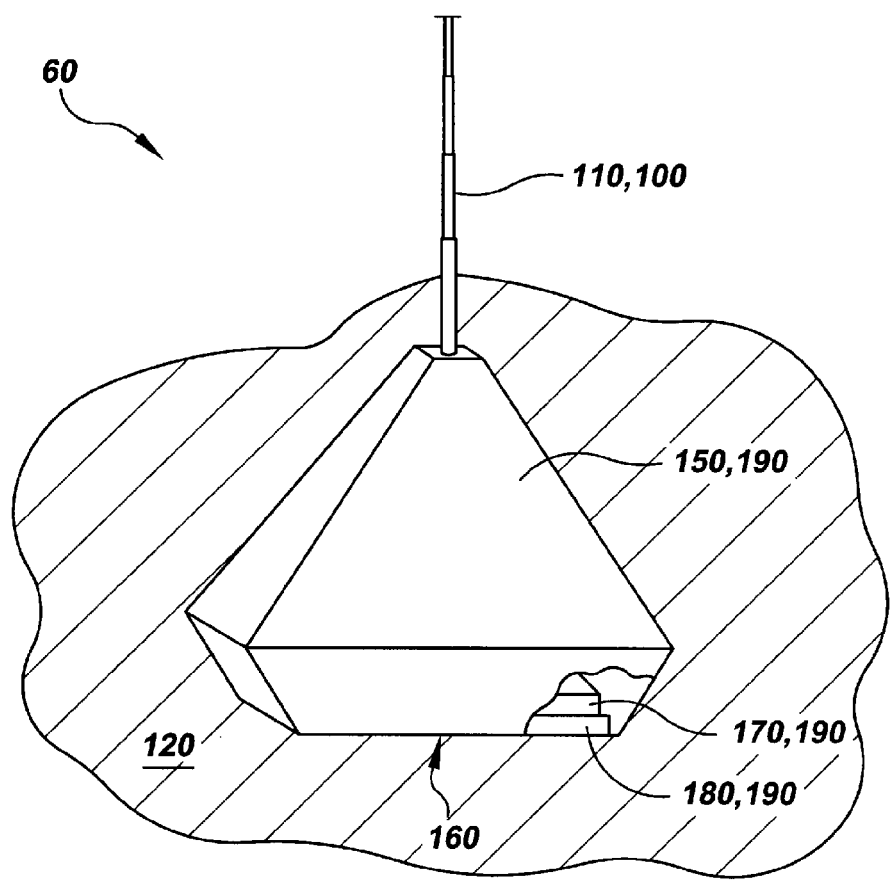
FIG. 10 shows another embodiment of the relay device.

FIG. 10 shows another embodiment of the relay device 60. In this embodiment, the self-righting mechanism 190 is a combination of the shape of the housing 150 and the placement of the relay processor 180, the internal radio 170, and any other supporting electronics. With the relay processor 180 and the internal radio 170 being mounted inside the housing 150 near the bottom surface 160, the shape of the housing 150 causes the relay device 60 to rest on a support surface 120 in an upright position in the presence of gravitational forces. In this embodiment, the antenna 110 is shown as a telescoping antenna in a fully extended position. In its collapsed position, the antenna 110 may fit inside the housing 150. The antenna 110 may be internally spring-loaded and double as the deployment mechanism 100. This embodiment of the relay device 60 may be watertight, float on a liquid support surface 120, or rest on a solid support surface 120.

From the above description of the relay device deployment system 10, it is manifest that various techniques may be used for implementing the concepts of system 10 without departing from its scope. The described embodiments are to be considered in all respects as illustrative and not restrictive. It should also be understood that system 10 is not limited to the particular embodiments described herein, but is capable of many embodiments without departing from the scope of the claims.

We claim:

1. A relay device deployment system comprising:
   a deployer configured to be mounted on a mobile platform;
   a self-righting, self-contained, wireless relay device releasably stowed in the deployer, wherein the relay device comprises an extendable antenna and wherein the relay device is configured to be deployed from the deployer to a support surface and to operate as a node in an ad hoc telecommunications network;
   a node radio mounted to the deployer, wherein the node radio is configured to operate as a node in the ad hoc telecommunications network;
   a deployment mechanism mounted to the deployer, wherein the deployment mechanism is configured to deploy the relay device; and
   a processor mounted inside the deployer and operatively coupled to the node radio and the deployment mechanism, wherein the processor is configured to monitor the ad hoc telecommunication network's strength and to send a signal to the deployment mechanism to deploy the relay device when the ad hoc telecommunication network strength drops below a threshold value.

2. The relay device deployment system of claim 1, wherein the deployer is configured to be communicatively coupled to the mobile platform.

3. The relay device deployment system of claim 2, wherein the deployer further comprises an Ethernet interface port.

4. The relay device deployment system of claim 2, wherein the antenna is a dipole antenna with a feed-point over 46 centimeters in height when the antenna is fully extended.

5. The relay device deployment system of claim 4, further comprising a manual release button operatively coupled to the deployment mechanism, wherein the manual release button is configured to allow a user to manually release the relay device.

6. The relay device deployment system of claim 5, further comprising a magnetic activation switch mounted inside the relay device, and a magnetic field generator mounted within the deployer, wherein the processor is configured to manipulate a magnetic field with the magnetic field generator to activate the relay device.

7. The relay device deployment system of claim 6, wherein the mobile platform is unmanned.

8. The relay device deployment system of claim 7, further comprising a deployment detection sensor operatively coupled to the processor, wherein the deployment detection sensor is configured to send a signal to the processor upon detecting an absence of the relay device.

9. The relay device deployment system of claim 8, wherein the processor comprises a first processor and a second processor communicatively coupled to each other, wherein the first processor is configured to communicate over the ad hoc telecommunications network, to monitor the ad hoc telecommunication network's strength, and to send a signal to the second processor when the ad hoc telecommunication network strength drops below the threshold value, and wherein the second processor is operatively coupled to the deployment mechanism, the magnetic field generator, and the deployment detection sensor, and wherein the second processor is configured to interpret commands sent by the first processor and to communicate relay device deployment status to the first processor.

10. A system for maintaining an ad hoc communications network between a base and a mobile platform comprising:
 a wireless, self-righting relay device configured to operate as a node in the ad hoc telecommunication network, wherein the relay device comprises an extendable antenna;
 a deployer configured to be physically and communicatively coupled to the mobile platform, wherein the deployer comprises:
  a radio configured to operate as a node in the ad hoc telecommunication network,
  a bay configured to stow the relay device,
  a deployment mechanism mounted inside the bay, wherein the deployment mechanism is configured to eject the relay device from the bay to a support surface,
  a processor mounted inside the deployer and electrically coupled to the radio and the deployment mechanism, wherein the processor is configured to monitor the ad hoc telecommunication network's strength; and
 wherein the deployer is configured to automatically deploy the relay device when the ad hoc telecommunication network strength drops below a threshold value.

11. The system of claim 10, wherein the antenna of the deployed relay device has a feed-point height of at least 46 centimeters from the support surface.

12. The system of claim 11, wherein the mobile platform is unmanned.

13. The system of claim 12, further comprising a manual release button operatively coupled to the deployment mechanism, wherein the manual release button is configured to allow a user to manually release the relay device.

14. The system of claim 13, further comprising a magnetic activation switch mounted inside the relay device, and a magnetic field generator mounted within the deployer, wherein the processor is configured to manipulate a magnetic field with the magnetic field generator to activate the relay device.

15. The system of claim 14, further comprising a deployment detection sensor operatively coupled to the processor, wherein the deployment detection sensor is configured to send a signal to the processor upon detecting an absence of the relay device.

16. The system of claim 15, wherein the deployer further comprises a deployer antenna, wherein the deployer antenna has a feed-point height of at least 46 centimeters from the support surface.

17. The system of claim 15, further comprising a plurality of wireless, self-righting relay devices each configured to operate as a node in the ad hoc telecommunication network, and each comprising an extendable antenna, wherein the bay is configured to stow the plurality of relay devices.

* * * * *